United States Patent [19]

Eirich et al.

[11] Patent Number: 4,758,372
[45] Date of Patent: Jul. 19, 1988

[54] METHOD OF PRODUCING LEAD PASTE FOR BATTERIES

[76] Inventors: Hubert Eirich, Sandweg 16; Walter Eirich, Spessartweg 18; Paul Eirich, Bahnhofstr. 11, all of 6969 Hardheim, Fed. Rep. of Germany

[21] Appl. No.: 875,241

[22] Filed: Jun. 16, 1986

Related U.S. Application Data

[63] Continuation-in-part of Ser. No. 611,776, May 18, 1984, abandoned.

[30] Foreign Application Priority Data

May 21, 1983 [DE] Fed. Rep. of Germany ....... 3318599

[51] Int. Cl.$^4$ .................. H01M 4/88; H01M 4/20; H01M 4/56
[52] U.S. Cl. .................. 252/182.1; 429/188; 429/189; 429/228
[58] Field of Search .................. 252/182.1; 429/188, 429/189, 228; 141/1.1; 29/2, 623.1

[56] References Cited

U.S. PATENT DOCUMENTS

| 1,374,076 | 4/1921 | Grimditch | 141/1.1 |
| 1,991,314 | 3/1930 | Chamberlain | 252/182.1 |
| 3,576,675 | 12/1968 | Abramson et al. | 252/182.1 |
| 4,098,494 | 7/1978 | Howlett | 252/182.1 |
| 4,346,022 | 8/1982 | Wolcott et al. | 141/1.1 |
| 4,363,742 | 12/1982 | Stone | 252/182.1 |

FOREIGN PATENT DOCUMENTS

| 1160907 | 1/1964 | Fed. Rep. of Germany . |
| 1951564 | 6/1970 | Fed. Rep. of Germany . |
| 2360574 | 6/1975 | Fed. Rep. of Germany . |
| 724369 | 2/1955 | United Kingdom . |
| 2013391 | 8/1979 | United Kingdom . |
| 2132406 | 7/1984 | United Kingdom . |

Primary Examiner—John F. Terapane
Assistant Examiner—Virginia B. Caress
Attorney, Agent, or Firm—Biebel, French & Nauman

[57] ABSTRACT

In order to reduce the duration of the method of producing lead paste for batteries by mixing lead oxide, sulphuric acid, water and possibly conventional additives below a limit temperature with at least partial cooling, acid is first added at substantially the maximum speed possible for distribution in the mix, without causing burning therein, and so quickly that the amount of heat supplied to the mix is greater than the amount of heat which is removed by cooling, and then, when the material being mixed reaches a predetermined operating temperature which is below the limit temperature, the addition of acid is regulated in dependence on constant temperature measurements in the material being mixed, in such a way that the temperature remains at the level of the operating temperature substantially until the end of the operation of adding acid.

12 Claims, 3 Drawing Sheets

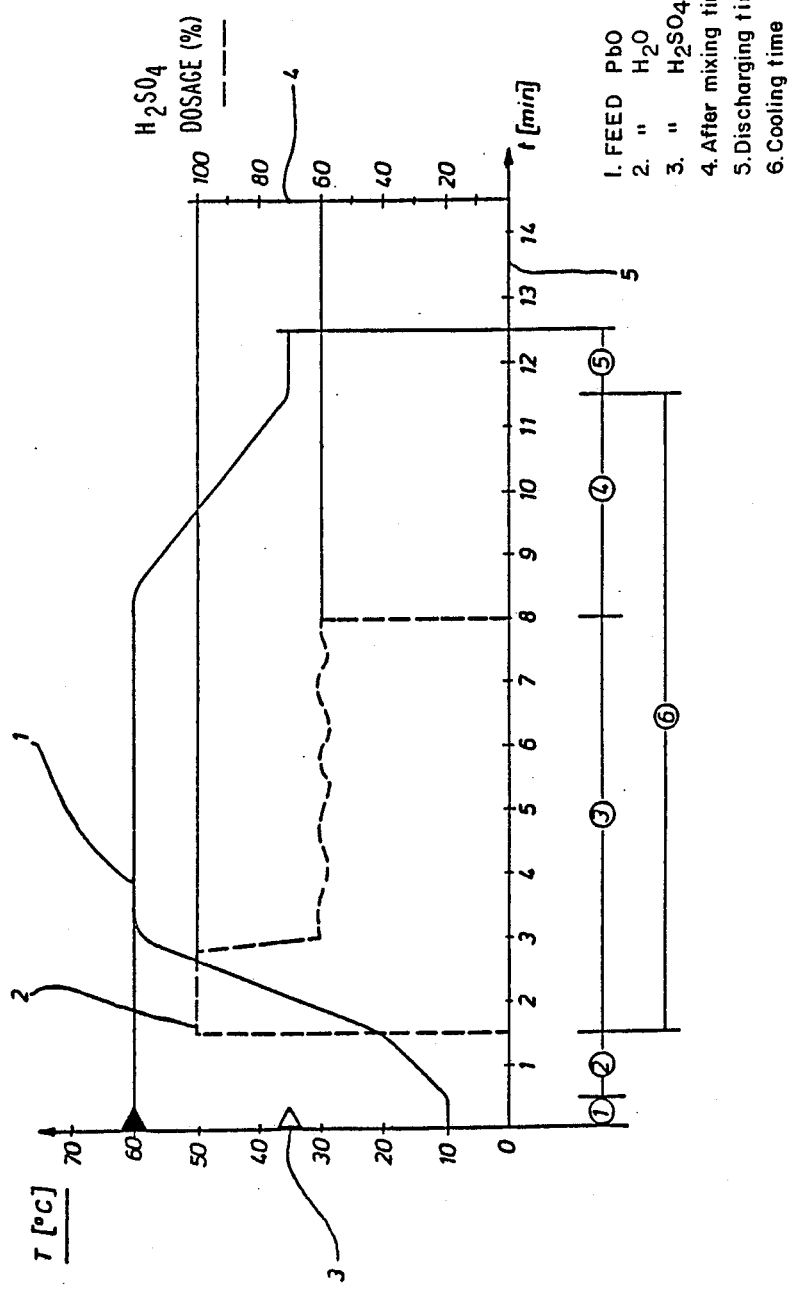

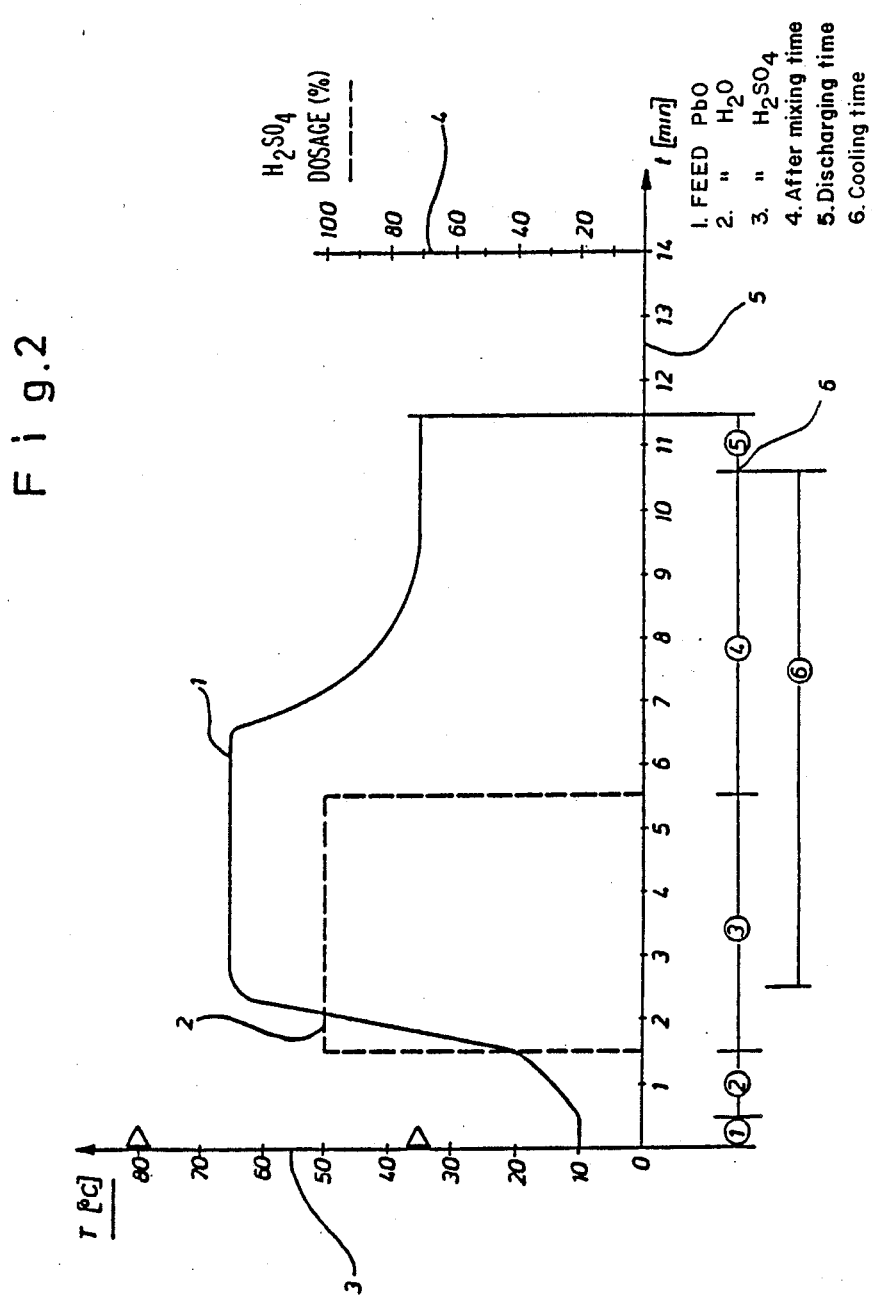

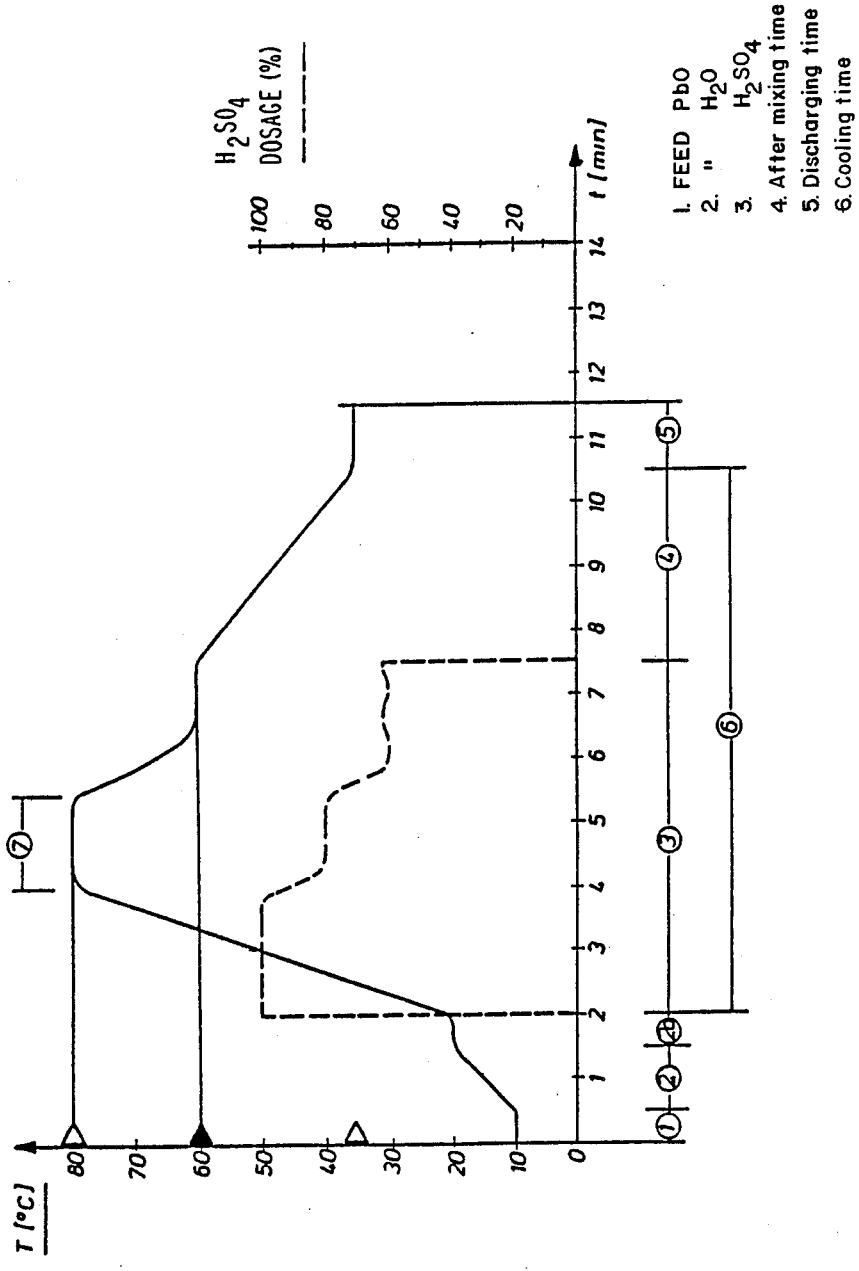

METHOD OF PRODUCING LEAD PASTE FOR BATTERIES

This is a continuation-in-part of co-pending application Ser. No. 611,776, filed May 18, 1984, now abandoned.

In the production of lead paste which in turn is used in the production of batteries, it is conventional practice for lead oxide to be mixed with sulphuric acid, water and possibly certain additives. During the mixing operation, a highly exothermic reaction occurs between the lead oxide and the sulphuric acid.

In the previous methods of producing such a lead paste for batteries, the lead oxide (PbO) is usually made available first, whereafter water and finally sulphuric acid are added. Many manufacturers also take the water first, to which they then add the lead oxide and subsequently the sulphuric acid. In all those known methods, the sulphuric acid is added at a constant rate. During the operation of adding the acid, the temperature of the mix rises steadily as a result of the exothermic reaction while after the reactions in the mix are concluded, the temperature gradually falls again.

In order not to have an adverse effect on the quality of the lead paste from the point of view of subsequent use thereof, the mix should not exceed a certain maximum temperature. For that purpose, the known methods provide that the rate of constant addition of the acid is adjusted in such a way that the predetermined maximum temperature of the mix is reached approximately at the end of the exothermic reactions, whereupon the mix is then cooled down again by the termination of the exothermic reactions, without exceeding the predetermined maximum temperature.

It is also known that local overheating phenomena in the mix are harmful as they result in so-called burning in the mix, which has a disadvantageous effect on the quality of the lead paste. In order to avoid such local overheating and burning, in particular at the point at which the sulphuric acid is introduced, it is necessary to provide for correspondingly intensive stirring in order for the sulphuric acid to be rapidly distributed in the mix.

The known methods suffer from various disadvantages. The duration of the mixing operation is comparatively long and cannot be reduced with the conventional mode of operation, without exceeding the maximum permissible temperature. In addition, the production parameters frequently vary from batch to batch in dependence on the machine temperature, the starting temperature of the components of the mix, the ambient temperature, the temperature and relative humidity of the cooling air, the fineness or specific area of the lead oxide, the density of the acid, the condition of maintenance of the cooling apparatus, and other factors. In regard to individual batches, that can result in the maximum temperature being unintentionally exceeded as the constant addition of acid at a rate of addition which has once been fixed does not take account of such alterations in the production parameters.

Now, the object of the present invention is that of improving the known method of producing lead paste for batteries. In addition, the invention seeks to provide that the method is reduced in duration and the possibility of burning occurring, with impairment of the qualities of the lead paste, is eliminated. The method according to the invention of producing lead paste for batteries by mixing lead oxide, sulphuric acid, water and optionally conventional additives below a limit temperature with at least temporary cooling is characterised in that acid is firstly added at substantially the maximum speed possible for distribution in the mix without burning, and so rapidly that the amount of heat supplied to the material being mixed is greater than the amount of heat removed by cooling, and then, when the material being mixed reaches a predetermined operating temperature below the limit temperature, the operation of adding acid is regulated in dependence on constant temperature measurements in the material being mixed, in such a way that the temperature remains substantially at the level of the operating temperature substantially until the end of the operation of adding acid.

As, with that method, at the beginning of the operation of adding acid, that operation is effected at the maximum possible speed which is permitted by the intensity of mixing of the apparatus and the temperature difference between the starting temperature of the mix and the limit temperature, and as the temperature of the material being mixed does not move into the vicinity of the limit temperature only at points but is maintained in the vicinity of the limit temperature throughout the entire duration of the exothermic reactions in the mix, the duration of the mixing operation is considerably reduced so that, in accordance with the method according to the invention, including the charging operation, the post-mixing time and the emptying operation, the lead paste can be produced within a few minutes, such as for example within from 8 to 15 minutes.

In that respect, even with fluctuating batch compositions, or with production parameters which vary from batch to batch, the method avoids unintentionally exceeding the limit temperature and thus avoids detrimentally affecting the properties of the lead paste.

The reference to avoiding unintentionally exceeding the limit temperature does not mean that the limit temperature may not be exceeded at all in the course of the method. On the contrary, it may be advantageous, in regard to the properties of the lead paste, firstly to set and to maintain a pre-heating temperature which is above the operating temperature and possibly above the limit temperature, in the material being mixed, for a limited period of time, that is to say, over a predetermined period of time, with the temperature only thereafter being reduced to the operating temperature. For example, the above-mentioned preheating temperatures may be maintained for a period of about 1 to 3 minutes before the material being mixed is reduced to the operating temperature.

The absolute value of the operating temperature is not critical in itself. It will be appreciated that the operating temperature must lie below the limit temperature and on the other hand is desirably as close as possible to the limit temperature in order to achieve the optimum reduction in the length of time taken for the mixing operation. Desirably, the operating temperature is so selected that it is from 5° to 20° C. below the limit temperature. In absolute terms, the operating temperature is generally in the range of from 50° to 70° and in particular in the range of from 55° to 65° C., being for example about 60° C. If a preheating temperature is used, it may between 70° and 90°, preferably between 75° and 85°, as approximately at 80° C.

The constant temperature measurements in the material being mixed are made by temperature measuring means which are installed in the mixer. Preferably, the temperature measuring operation should be carried out in a non-contact manner, without contact with the material being mixed, such as for example by means of an infra-red pyrometer. It is possible to install in front of the infra-red pyrometer a tube into which air is blown from a fan so that the air flows away from the lens of the pyrometer toward the end of the tube which is towards the material being mixed, and in that way prevents dust, vapours and the like from entering, as that would cause soiling of the lens.

It will be appreciated that other per se known temperature measuring means may be used, which permit constant measurement of the temperature in the material being mixed. When reference is made herein to constant temperature measurement in the material being mixed, that does not mean that the temperature measuring means must be disposed in the material being mixed, but that the temperature obtaining in the material being mixed is constantly measured.

In dependence on the temperature obtaining in the material being mixed, the rate of addition of acid is automatically regulated in order to produce the temperature profile referred to in the opening part of this specification. In that respect, for example the acid may be fed in at a higher rate at the beginning, in which respect care must obviously be taken to ensure that it is sufficiently rapidly distributed in the material being mixed, to avoid burning, that is to say, local overheating thereof. Before the limit temperature is reached, the addition of acid is then restricted or throttled in good time in order to ensure that the limit temperature is not exceeded, due to the exothermic residual reactions of the acid which was added at high speed. As soon as the temperature of the material being mixed shows a falling tendency again, with the exothmeric reactions dying away, the addition of acid is then accelerated against and brought up to the operating temperature. The operating temperature is maintained from then on, to the end of the operation of adding acid, with small fluctuations up and down.

As in the case of known mixing methods for producing lead paste, the present method also involves cooling at least from time to time. In accordance with the invention, the cooling action may be used in addition to the addition of acid, to maintain the above-described temperature profile. In other words, in addition to the addition of acid, the intensity of the cooling action may also be regulated, in dependence on the temperature of the material being mixed, in such a way that the temperature of the material being mixed remains substantially at the level of the operating temperature. That may be done by opening and closing a flap for the mixer cooling action, and the opening and closing movements of the flap are desirably controlled, like the addition of acid, in dependence on the temperature of the material being mixed, as detected by the temperature measuring means.

Control in the method according to the invention is advantageously provided by means of a computer of conventional design. It may also be used at the same time for controlling the metering and weighing operation. In that way it is possible to keep the capital investment costs involved in carrying out the method at a low level. At the same time as the enormous reduction in the duration of the method, the quality of the lead paste is optimised and kept constant from batch to batch.

At the end of the mixing period, the temperature of the mix may be measured again and any deviation from the reference value, that may be detected, can be used automatically to correct the preset temperatures and presetting times for the next batch to be fed to the mixer, by that amount. Therefore, control in regard to the intensity of the cooling action advantageously also sets a predetermined temperature for removal of the mixed material.

Accordingly, the entire time sequence involved in carrying out the method of the invention usually provides that firstly the lead oxide is taken, and then water is added, although that sequence may be reversed. The operation of adding sulphuric acid is then commenced, with the above-described temperature profile in the mix being maintained. After the entire predetermined amount of acid has been added, there is a post-mixing time during which the temperature of the material being mixed falls to the discharge temperature, whereupon the material is discharged from the mixer. From the point of view of the times involved, that procedure may be for example such that the operation of charging the mixer with lead oxide and water takes about 2 minutes, the operation of adding the sulphuric acid takes about 5 to 7 minutes, the post-mixing time is about 3 minutes and the mixer-emptying time is about 1 minute. The sulfuric acid is added such that the reaction mixture is maintained at the operating temperature (FIGS. 1 and 2) or higher (see FIG. 3) for at least 1 minute, preferably at least 2 minutes, and more preferably at least 3 minutes.

The plasticity (workability) of the paste is also known to be a consideration of importance from the point of view of the production of lead paste. The plasticity of the paste is essentially influenced by the water content thereof and that is in turn influenced by evaporation during the mixing process. It is desirable for the plasticity of the material being mixed to be kept within certain predetermined limits during the method of the invention, and for the plasticity of the material being mixed to be set to a given final value in order to make it easier to empty the lead paste from the mixer and to provide for further processing of the lead paste. The step of adjusting the plasticity of the material to the best possible permanent or steady value and a predetermined final value can be carried out both by the further addition of water and also by influencing evaporation by greater or lesser cooling. It is desirable also to regulate the operation of adjusting the plasticity of the mixing material while the process is being carried out, more specifically, indirectly by way of the addition of water and/or the intensity of the cooling action. As both those factors, both the subsequent addition of water and also an increase or a reduction in the intensity of the cooling action, influence the temperature of the mix and cause variations in the temperature in the mix, both those factors also automatically have an effect on the operation of adding acid as, by way of the constant measurements taken in respect of the temperature in the material being mixed and the control of the addition of acid, in dependence on such measurements, a drop in temperature in the material being mixed by the addition of water or an increase in the intensity of the cooling action automatically results in an increase in the addition of acid and an increase in the temperature in the material being mixed due to a reduction in the intensity of the cooling action automatically results in a reduction in the addition of acid.

The plasticity of the material is monitored by way of the power consumption of the mixer drive motors, for example by way of an ammeter or a means for measuring the motor output. When the values detected deviate from the reference value, the operation of adding the water for correcting such deviation is desirably effected not by way of fixed pulses but by way of pulses whose magnitude is controlled in proportion to the difference between the actual value and the reference value.

In the drawings, FIGS. 1 to 3 show diagrams illustrating the addition of sulphuric acid and the temperature of the material being mixed, in dependence on time, in respect of three embodiments which are given by way of example. FIGS. 1 to 3 show the operating procedures which are described hereinafter in Examples 1 to 3.

In each of the diagrams, the solid line 1 denotes the temperature pattern in the material being mixed, while the broken line 2 denotes the addition of acid as the metering power or output in relation to the maximum power or output (=maximum speed of distribution of the mixing machine). The left-hand ordinate 3 shows the temperature of the material being mixed, the right-hand ordinate 4 shows the metering power or output in terms of percent of the maximum power or output, while the abscissae 5 show the time within a mixer operating cycle.

EXAMPLE 1

In Example 1 which relates to FIG. 1 of the drawing, lead oxide is supplied in the time interval 1 and water is added in the time interval 2. When that occurs, some reaction heat is already generated. The operation of adding sulphuric acid is effected in the time interval 3.

At the beginning of the operation of adding the acid, the sulphuric acid is added at the maximum possible rate, that is to say, at a rate corresponding to the maximum output of the mixer, at which the mixer can just distribute the sulphuric acid added in the material being mixed, without burning phenomena. Just before the operating temperature of 60° C. is reached, the addition of acid is reduced to 60% of the maximum metering power and is, from then on, maintained substantially at a constant level, whereby the temperature of the material being mixed is maintained at the operating temperature of 60° C.

After 8 minutes at the end of the operation of introducing the sulphuric acid, as indicated by 3, the post mixing time 4 begins, without the further addition of acid. In the post-mixing time 4, the material is cooled to the mixer-emptying temperature required. The time interval 5 denotes the mixer-emptying time.

The cooling action is applied from the beginning of the operation of adding acid, to the end of the post-mixing time. In this case, the step of limiting the temperature of the material to the level of the operating temperature can only be effected by reducing the acid metering power. The cooling time is shown as the time interval 6.

EXAMPLE 2

The alternative form of the method of Example 2 relates to FIG. 2 of the drawing. Therein, once again the time interval 1 denotes the lead oxide charging period while the time interval 2 denotes the charging time for the water. In the time interval 3, the sulphuric acid is added; in this case, the cooling output of the apparatus, in contrast to Example 1, is greater than the heat supplied by the reaction. For that reason, in this case the cooling means is switched on only when the operating temperature is reached. The addition of acid is therefore maintained at the maximum rate of distribution of the mixing machine while the cooling is regulated in such a way that the operating temperature is maintained.

After the addition of acid is terminated, the cooling action is produced at full power until the predetermined emptying temperature (35° C.) is reached, in the post-mixing time 4. The time interval 5 once again denotes the mixer emptying time.

EXAMPLE 3

This Example relates to FIG. 3 of the accompanying drawing. This alternative form of the method is distinguished in that the operation of adding additives is carried out in the time interval 2a and that the mix is firstly heated to a preheating temperature which is at 80° C., and then reduced to the operating temperature of 60° C., after a predetermined period of time.

The time interval 1 denotes the lead oxide charging time, the time interval 2 denotes the water charging time and the time interval 2a denotes the time for adding the additives. The acid is added in the time interval 3, more specifically in such a way that the amount of acid corresponding to the maximum power or output of the mixing machine is added, until just before the preheating temperature is reached.

As, in this Example, as in the case of Example 1, the cooling output of the apparatus is lower than the amount of heat supplied by the chemical reaction, the temperature is maintained at the preheating temperature during the preheating period 7, with the apparatus at full cooling output, by reducing the acid metering output to 80% and keeping it approximately constant at that level. After the expiry of the preheating period 7, the acid metering output is further reduced to about 60% so that the material being mixed is cooled down to the operating temperature. Up to the end of the operation of adding the acid, the metering output is held at that level so that the temperature of the mix remains at the operating temperature of 60°.

In the subsequent post-mixing time, after the termination of the operating of adding acid, the mix is cooled to the mixer-emptying temperature of about 35° C., with full cooling. The time interval 5 again denotes the mixer-emptying time.

In this Example therefore, as in Example 1, cooling is effected throughout the entire operation of adding acid and the post-mixing time. The cooling time is again denoted by 6.

We claim:

1. In a batchwise method of producing lead paste for batteries by mixing lead oxide, sulfuric acid, and water below a limit temperature at which the lead paste can be degraded with at least partial cooling; the improvement which comprises first adding sulfuric acid to a mixture of lead oxide and water at substantially the maximum speed possible for distribution of said acid in the mixture without burning and sufficiently rapidly that the amount of heat generated in said mixture is greater than the amount of heat removed by cooling, and thereafter upon said mixture reaching a predetermined operating temperature in the range of about 50° to 70° C., continuing the addition of said acid and regulating said addition in response to continuous temperature measurements in said mixture such that the temperature of said mixture remains substantially at said operating temperature substantially until the end of the addition of said acid.

2. The method of claim 1 wherein, in addition to the addition of said sulfuric acid, said cooling is regulated such that the temperature of said mixture remains substantially at said operating temperature.

3. The method of claim 2 wherein the addition of said sulfuric acid and/or said cooling are adjusted and regulated such that said mixture initially reaches a preheating temperature which is above said operating temperature, said preheating temperature being maintained over a period of time, and only thereafter is the temperature of said mixture reduced to said operating temperature and maintained substantially at said operating temperature until the end of the addition of said acid.

4. The method of claim 1 wherein the plasticity of said mixture is regulated by the addition of said water and said cooling and the addition of said sulfuric acid is also controlled in dependence on changes in temperature caused thereby.

5. The method of claim 4 wherein said plasticity of said mixture is maintained substantially constant during the mixing operation by regulating the addition of said water and said cooling.

6. The method of claim 1 wherein a predetermined material discharge temperature is set by controlling the intensity of the cooling.

7. The method of claim 1 wherein the addition of said sulfuric acid is controlled in dependence on the measured increase in temperature in such a way that the addition of said acid is reduced shortly before said mixture reaches said operating temperature or the preheating temperature, respectively.

8. The method of claim 1 wherein said operating temperature is about 55° to 65° C.

9. The method of claim 1 wherein said operating temperature is 5° to 20° C. below said limit temperature.

10. The method of claim 1 wherein said mixture is maintained at said operating temperature for at least one minute.

11. The method of claim 1 wherein said mixture is maintained at said operating temperature for at least two minutes.

12. The method of claim 1 wherein said mixture is maintained at said operating temperature for at least 3 minutes.

* * * * *